United States Patent
Flores et al.

(10) Patent No.: US 7,610,518 B2
(45) Date of Patent: *Oct. 27, 2009

(54) PROGRAM COUNTER RANGE COMPARATOR WITH EQUALITY, GREATER THAN, LESS THAN AND NON-EQUAL DETECTION MODES

(75) Inventors: Jose L. Flores, Richardson, TX (US); Lewis Nardini, Dallas, TX (US); Maria B. H. Gill, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 498 days.

This patent is subject to a terminal disclaimer.

(21) Appl. No.: 11/467,727

(22) Filed: Aug. 28, 2006

(65) Prior Publication Data

US 2006/0282706 A1   Dec. 14, 2006

Related U.S. Application Data

(62) Division of application No. 10/302,192, filed on Nov. 22, 2002, now Pat. No. 7,117,398.

(51) Int. Cl.
G06F 11/00 (2006.01)
G06F 11/30 (2006.01)
(52) U.S. Cl. .............................. 714/49; 714/39; 714/50; 711/201

(58) Field of Classification Search .................. 714/30, 714/39, 49, 50; 711/201
See application file for complete search history.

(56) References Cited

U.S. PATENT DOCUMENTS

| | | | | |
|---|---|---|---|---|
| 4,434,464 A | * | 2/1984 | Suzuki et al. | 711/164 |
| 4,584,666 A | * | 4/1986 | Zolnowsky et al. | 714/53 |
| 4,792,891 A | * | 12/1988 | Baba | 711/1 |
| 5,809,544 A | * | 9/1998 | Dorsey et al. | 711/163 |
| 5,822,579 A | | 10/1998 | Wichman | |
| 6,047,388 A | * | 4/2000 | Bashore et al. | 714/38 |
| 6,640,198 B2 | * | 10/2003 | Miyazaki et al. | 702/118 |
| 6,859,897 B2 | * | 2/2005 | Swoboda | 714/53 |
| 6,954,878 B2 | * | 10/2005 | Kudo | 714/30 |

* cited by examiner

*Primary Examiner*—Scott T Baderman
*Assistant Examiner*—Joseph Schell
(74) *Attorney, Agent, or Firm*—Robert D. Marshall, Jr.; Wade J. Brady, III; Frederick J. Telecky, Jr.

(57) ABSTRACT

An program counter address comparator includes two comparators comparing an input program counter address with respective reference addresses. The comparators produce a match indication on selectable criteria, such as greater than, less than, equal to, not equal to, less than or equal to, and greater than or equal to, and can be selectively chained. Input multiplexers permit selection of either the program counter address bus or a secondary address bus. The reference addresses and control functions are enabled via central processing unit accessible memory mapped registers.

8 Claims, 3 Drawing Sheets

PROGRAM COUNTER RANGE COMPARATOR WITH EQUALITY, GREATER THAN, LESS THAN AND NON-EQUAL DETECTION MODES

This application is a divisional of U.S. patent application Ser. No. 10/302,192 filed Nov. 22, 2002 now U.S. Pat. No. 7,117,398.

TECHNICAL FIELD OF THE INVENTION

The technical field of this invention is emulation hardware particularly for highly integrated digital signal processing systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates an emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

The comparator described here can operate as two individual comparators each of them comparing the program counter (PC) value of a processor against a reference value stored in a register, or it can operate as a single device that compares the program counter against two reference values that form a double bounded range.

The specific resources required for the implementation of the comparator can vary greatly depending on the requirements and constraints of a given implementation. In the preferred embodiment, the range comparator formed of two single reference comparators requires five user visible registers in addition to the core comparator function.

Each of the two comparators can produce independent or dependent results based on selection made via a control register. The comparator can generate a match based on one of six comparison criteria: 1) program counter equal to reference; 2) program counter not equal to reference; 3) program counter greater than reference; 4) program counter greater than or equal to reference; 5) program counter less than reference; and 6) program counter less than or equal to reference.

The comparator can be programmed via an interface to memory mapped registers. This interface is called the configuration bus (cfgb).

The comparator control logic includes a lookup table that can be programmed in order to add flexibility to the logic behavior of the comparator.

The comparator capabilities can be exploited as a tool to be used by a hardware debug system that will take the comparator result as an input and will provide a wide range of responses depending on the configuration of the debug system.

BRIEF DESCRIPTION OF THE DRAWINGS

These and other aspects of this invention are illustrated in the drawings, in which.

DETAILED DESCRIPTION OF PREFERRED EMBODIMENTS

Processor code developers face many challenges on getting the software to work during the early stages of development. This is specially true if they are new to the software implementation or the processor architecture. The debugging of software is a very complex task. The ability to trace or remain aware of the program counter value as the software executes is one of the most valuable pieces of information on troubleshooting code problems. Thus a comparator like the one described in this application is a powerful tool on the code debugging process. Other potential applications not related to debugging could include detection of program counter values for triggering system event interactions or change in processor operation context.

The comparator provides the ability to detect the occurrence or absence of an specific value or ranges of values in the processor's program counter. Having the comparator integrated within a hardware debugging system enhances the capability of the system for detecting and resolving problems in the code being executed by the processor.

The presence of the lookup table and the six different comparison criteria modes in the comparator here described enhance its capabilities and flexibility in the detection of software problems when debugging is based of the program counter value.

Enhancement of the capability and flexibility for detection of the occurrence or absence of an specific value or ranges of values in the processor=s program counter.

Figure 1:
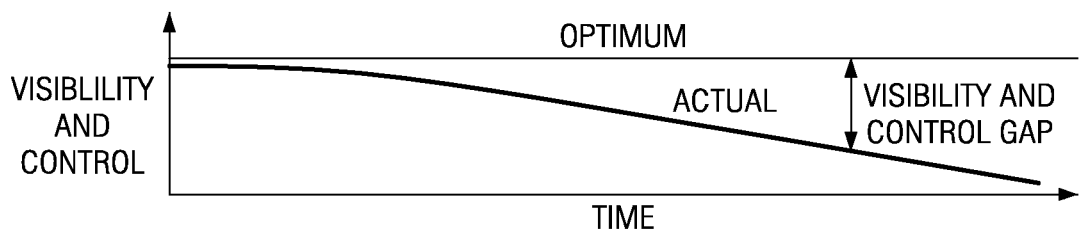
FIG. 1 illustrates the visibility and control of typical integrated circuits as a function of time due to increasing system integration.
Figure 2:
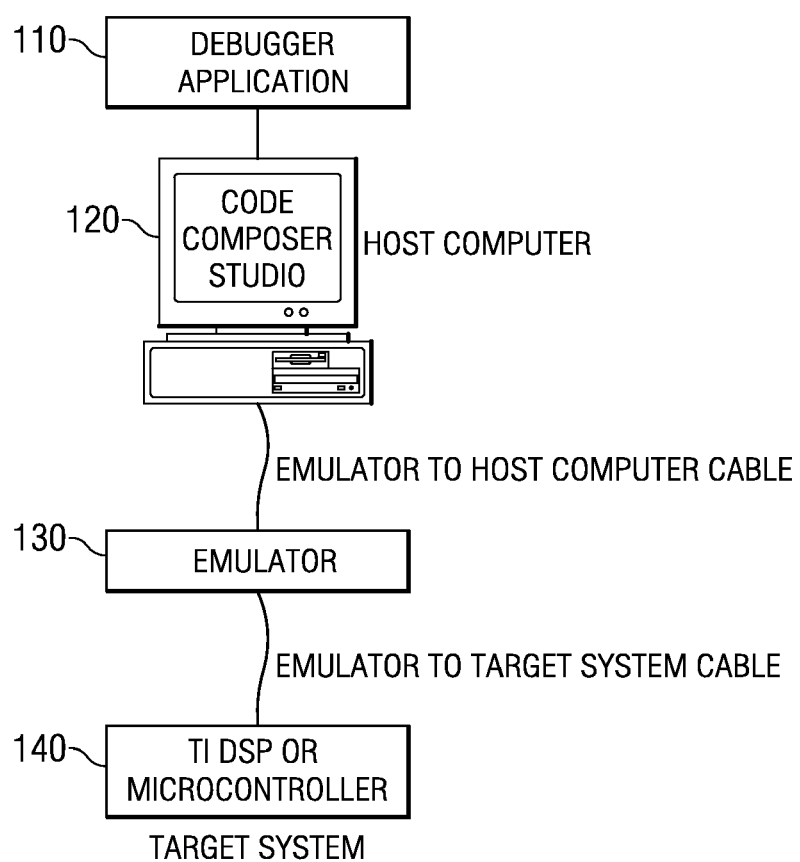
FIG. 2 illustrates an emulation system to which this invention is applicable.
Figure 3:
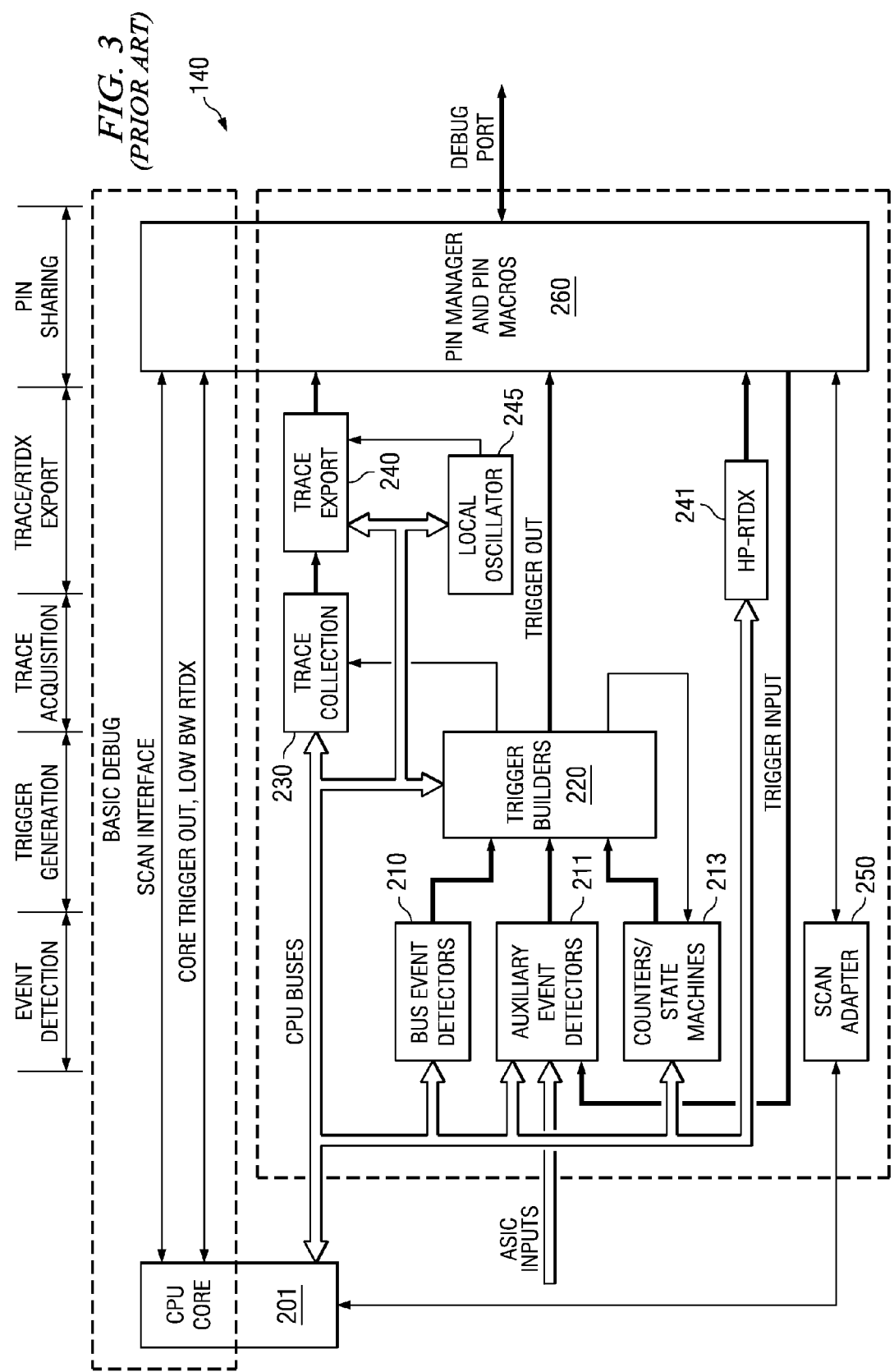
FIG. 3 illustrates in block diagram form a typical integrated circuit employing configurable emulation capability.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

Figure 4:
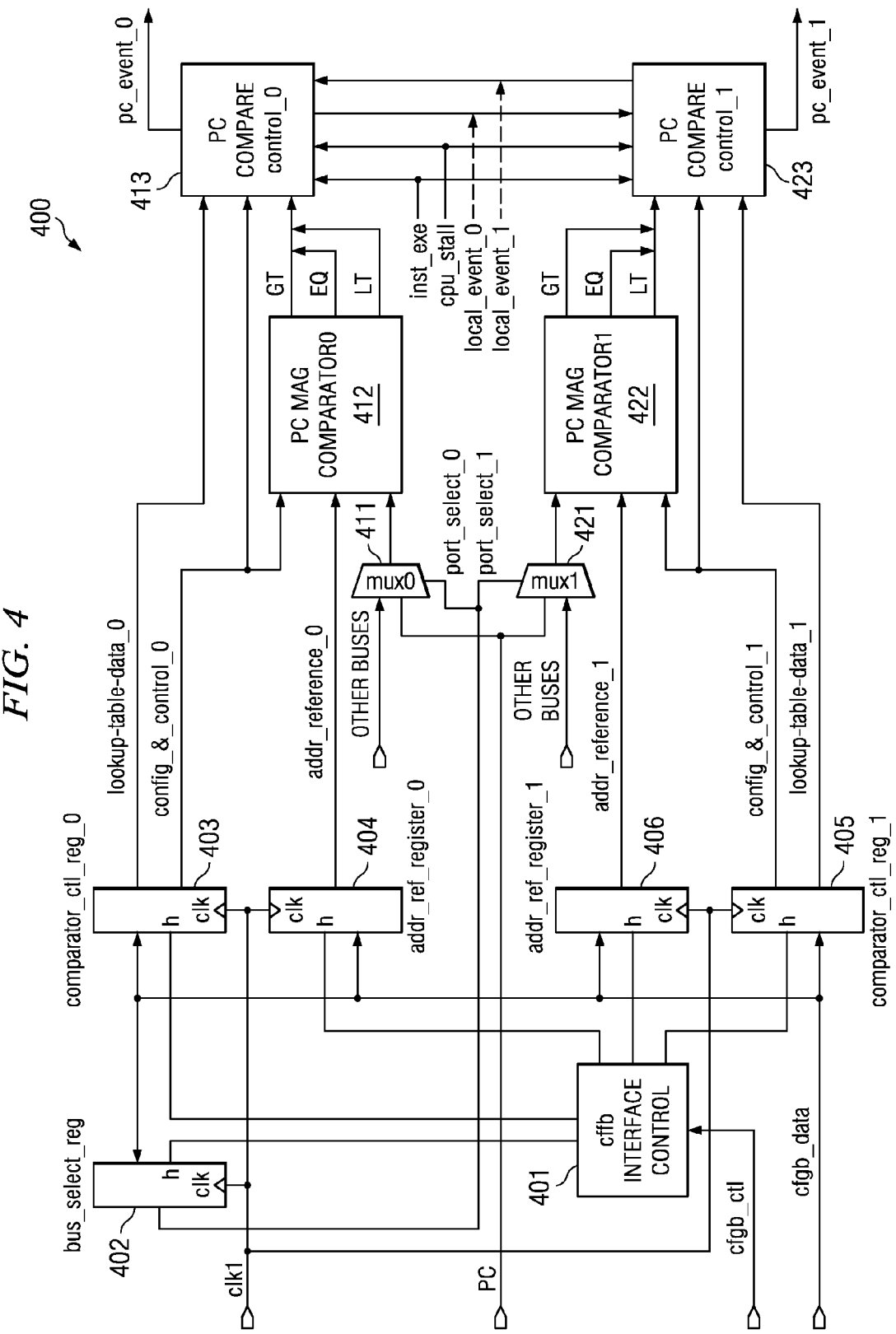
FIG. 4 illustrates in block diagram form two coupled program counter comparators.

FIG. 4 illustrates comparator 400 including two individual program counter comparators that integrate range comparison. Comparator 400 is preferably a part of bus event detectors 210. The first comparator is at the top of FIG. 4 and the second comparator is at the bottom. Each address comparator has 4 main components: a program counter sampling mechanism (multiplexers 411 and 421); configuration resources (bus select register 402, comparator control registers 403 and 405, and address reference registers 404 and 406); a program counter magnitude comparator (memory address magnitude comparators 412 and 422); and a program counter compare control block (413 and 423).

FIG. 4 illustrates two multiplexers 411 and 421 serving as the program counter sampling mechanism. Multiplexers 411 and 421 select the desired bus signal from the program counter bus and other busses. The user controls this bus selection of the two comparators by writing to the bus select register 402.

FIG. 4 illustrates 5 registers which are part of the comparator configuration. Bus select register 402, comparator control registers 403 and 405 and address reference registers 404 and 406 can be accessed like other configurable hardware resource in the processor via a memory interface called a configuration bus interface (cfgb). This memory interface includes configuration interface control 401 which receives a configuration control signal (cfgb_ctl). Configuration data (cfgb_data) and a configuration clock (cfgb_clk) are supplied to bus select register 402, comparator control registers 403 and 405 and address reference registers 404 and 406. Upon receipt of a register write request and the identity of the register via cfbg_ctl, configuration interface control 401 selects which register stores the data on the configuration data bus. The selected register stores the data on the configuration data bus upon the next configuration clock signal.

Data stored in bus select register 402 defines via multiplexers 411 and 421 which input bus is compared against the respective reference values. Multiplexer 411 selects either the program counter bus or the other bus for supply to program counter magnitude comparator 412. The selection of multiplexer 411 is controlled by bus select register 402 via port_select_0 signal. Address reference register 404 supplies a reference address to program counter magnitude comparator 412 for the comparison. Multiplexer 421 similarly selects the bus for program counter magnitude comparator 422 under control of bus select register 402 via port_select_1 signal. Address reference register 406 stores the reference address for program counter magnitude comparator 422 under control of bus select register 402.

Program counter magnitude comparators 412 and 422 perform the actual comparison between the reference value and the selected program counter bus. Memory address magnitude comparators 412 and 422 each generate an equal signal (EQ) if the program counter equals the reference address, a greater than signal (GT) if the program counter is greater than the reference address or a less than signal (LT) if the program counter is less than the reference address. Program counter magnitude comparator 412 receives a configuration and control signal config_&_control_0 from comparator control register 403. Program counter magnitude comparator 422 receives a similar configuration and control signal config_&_control_1 from comparator control register 405.

Outputs GT, LT, EQ from the memory address magnitude comparators 412 and 422 are supplied to respective program counter compare control blocks 413 and 423. Program counter compare control blocks 413 and 423 generate corresponding pc_event outputs depending on these input signals. Program counter compare control blocks 413 and 423 takes the 3 result signals (GT, LT, EQ) from corresponding program counter magnitude comparators 412 and 422 and expand them into six comparison mode selections. These are: greater than; less than; equal to; not equal to; less than or equal to; and greater than or equal to. Each of the two program counter comparators can be programmed in one of the 6 comparison modes. Program counter comparison control block 413 supplies local_event_0 signal to program counter comparison control block 423. Program counter comparison control block 423 supplies local_event_1 signal to program counter comparison control block 413.

Each program counter comparison control block 413 and 423 receives 4 entry lookup table from the corresponding comparator control register 403 and 405 via respective signals look_up_table_0 and look_up_table_1. The table look up signals enable the final outputs pc_event_0 and pc_event_1 to depend upon the local_event signal from the other program counter comparison control block. This dependency enables address range comparisons with each comparator testing one for the limit values.

What is claimed is:

1. A method of comparing program counter addresses comprising the steps of:
   storing a first reference address;
   comparing the first reference address with a program counter address and generating a greater than output, a less than output and an equal to output, each output depending upon the relationship between said first reference address and the program counter address;
   storing a second reference address;
   comparing the second reference address with the program counter address and generating a greater than output, a less than output and an equal to output, each output depending upon the relationship between said second reference address and the program counter address;
   generating a first local event signal dependent upon said greater than, said less than and said equal to output of said step of comparing the first reference address with the program counter address;
   generating a second local event signal dependent upon said greater than, said less than and said equal to output of said step of comparing the second reference address with the program counter address;
   generating a first program counter signal dependent upon said greater than, said less than and said equal to output of said step of comparing the first reference address with the program counter address and said second local event signal; and
   generating a second program counter signal dependent upon said greater than, said less than and said equal to output of said step of comparing the second reference address with the program counter address and said first local event signal.

2. The method of comparing program counter addresses of claim 1, further comprising the steps of:
   storing said first reference address in a first programmable reference address register via a central processing unit memory mapped register write command; and
   storing said second reference address in a second programmable address reference register via a central processing unit memory mapped register write command.

3. A method of comparing addresses comprising the steps of:
   storing a first reference address;
   selecting a first address on a program counter address bus or a secondary address on a secondary address bus dependent upon data stored in a programmable bus selection register;
   comparing the first reference address with the selected first address and generating a greater than output, a less than output and an equal to output, each output depending upon the relationship between said first reference address and the selected first address;
   storing a second reference address;
   selecting a second address on said program counter address bus or said secondary address on said secondary address bus dependent with the second reference addresses dependent upon data stored in said programmable bus selection register;
   storing a second reference address;
   comparing the second reference address with the selected second address and generating a greater than output, a less than output and an equal to output, each output depending upon the relationship between said second reference address and the selected second address;
   generating a first local event signal dependent upon said greater than, said less than and said equal to output of said step of comparing the first reference address with the program counter address;
   generating a second local event signal dependent upon said greater than, said less than and said equal to output of said step of comparing the second reference address with the program counter address;
   generating a first program counter signal dependent upon said greater than, said less than and said equal to output of said step of comparing the first reference address with the program counter address and said second local event signal; and
   generating a second program counter signal dependent upon said greater than, said less than and said equal to output of said step of comparing the second reference address with the program counter address and said first local event signal.

4. The method of comparing program counter addresses of claim 3, further comprising the step of:
   programming said programmable bus selection register via a central processing unit memory mapped register write command.

5. The method of comparing addresses of claim 3, further comprising the steps of:
   storing said first reference address in a first programmable reference address register via a central processing unit memory mapped register write command; and
   storing said second reference address in a second programmable address reference register via a central processing unit memory mapped register write command.

6. A method of comparing program counter addresses comprising the steps of:
   storing a first reference address;

comparing the first reference address with a program counter address and generating a greater than output, a less than output and an equal to output, each output depending upon the relationship between said first reference address and the program counter address;

storing a second reference address;

comparing the second reference address with the program counter address and generating a greater than output, a less than output and an equal to output, each output depending upon the relationship between said second reference address and the program counter address;

generating a first local event signal dependent upon said greater than, said less than and said equal to output of said step of comparing the first reference address with the program counter address;

generating a second local event signal dependent upon said greater than, said less than and said equal to output of said step of comparing the second reference address with the program counter address;

said step of generating said first local event signal and said first program counter compare event signal generates said first local event signal if said program counter address input is a selected one of (1) greater than, (2) less than, (3) equal to, (4) not equal to, (5) less than or equal to, and (6) greater than or equal to said first reference address dependent upon data stored in a first programmable comparison control register and selects whether said first program counter compare event signal is dependent upon or independent of said second local signal dependent upon data stored in the first programmable comparison control register;

generating a first program counter signal dependent upon said greater than, said less than and said equal to output of said step of comparing the first reference address with the program counter address and said second local event signal;

generating a second program counter signal dependent upon said greater than, said less than and said equal to output of said step of comparing the second reference address with the program counter address and said first local event signal; and said step of generating said second local event signal and said second program counter compare event signal generates said second local event signal if said program counter address input is a selected one of (1) greater than, (2) less than, (3) equal to, (4) not equal to, (5) less than or equal to, and (6) greater than or equal to said second reference address dependent upon data stores in a second programmable comparison control register and selects whether said second program counter compare event signal is dependent upon or independent of said first local signal dependent upon data stores in a second programmable comparison control register.

7. The method of comparing program counter addresses of claim 6, further including the step of:

programming said first and second programmable comparison control registers via corresponding central processing unit memory mapped register write commands.

8. The method of comparing program counter addresses of claim 6, further comprising the steps of:

storing said first reference address in a first programmable reference address register via a central processing unit memory mapped register write command; and storing said second reference address in a second programmable address reference register via a central processing unit memory mapped register write command.

* * * * *